(12) United States Patent
Akeley

(10) Patent No.: US 6,359,626 B1
(45) Date of Patent: Mar. 19, 2002

(54) MULTISAMPLE DITHER METHOD WITH EXACT RECONSTRUCTION

(75) Inventor: Kurt Akeley, Mountain View, CA (US)

(73) Assignee: Silicon Graphics, Incorporated, Mountain View, CA (US)

( * ) Notice: Subject to any disclaimer, the term of this patent is extended or adjusted under 35 U.S.C. 154(b) by 0 days.

(21) Appl. No.: 09/247,422

(22) Filed: Feb. 10, 1999

(51) Int. Cl.[7] .................................................. G09G 5/04
(52) U.S. Cl. ........................ 345/596; 345/600; 345/605; 345/549
(58) Field of Search ................................. 345/430, 431, 345/153, 155, 150, 589, 588, 600, 596, 597, 603, 605, 501, 506, 549; 348/466, 488, 496, 498, 502, 503, 520, 527, 557, 560, 583, 599, 612; 382/162, 167

(56) References Cited

U.S. PATENT DOCUMENTS

| | | | | |
|---|---|---|---|---|
| 4,929,978 A | * | 5/1990 | Kanamori | 355/38 |
| 4,941,038 A | * | 7/1990 | Walowit | 258/80 |
| 5,085,325 A | * | 2/1992 | Jones | 209/580 |
| 5,130,701 A | * | 7/1992 | White | 358/133 |
| 5,500,921 A | * | 3/1996 | Ruetz | 395/109 |
| 5,912,670 A | * | 6/1999 | Lipscomb | 345/419 |
| 6,031,541 A | * | 2/2000 | Lipscomb | 345/425 |
| 6,154,195 A | * | 11/2000 | Young | 345/153 |

* cited by examiner

Primary Examiner—Jeffery Brier
Assistant Examiner—Wesner Sajous
(74) Attorney, Agent, or Firm—Squire, Sanders & Dempsey

(57) ABSTRACT

A method and apparatus for multisample dithering is provided. For the method of the present invention, a graphics pipeline generates a series of b-bit color sample values for each pixel that is to be processed. Each color sample is defined to include one or more omitted values. The omitted values allow the color sample values to have a range that exceeds the range that would normally be associated with the b-bits of each color sample value. The extended range of the color sample values allows the color sample values to be summed to exactly reconstruct all color values. At the same time, the values in the color samples are close to exact values. This means that constructed color values are close to their correct values.

15 Claims, 4 Drawing Sheets

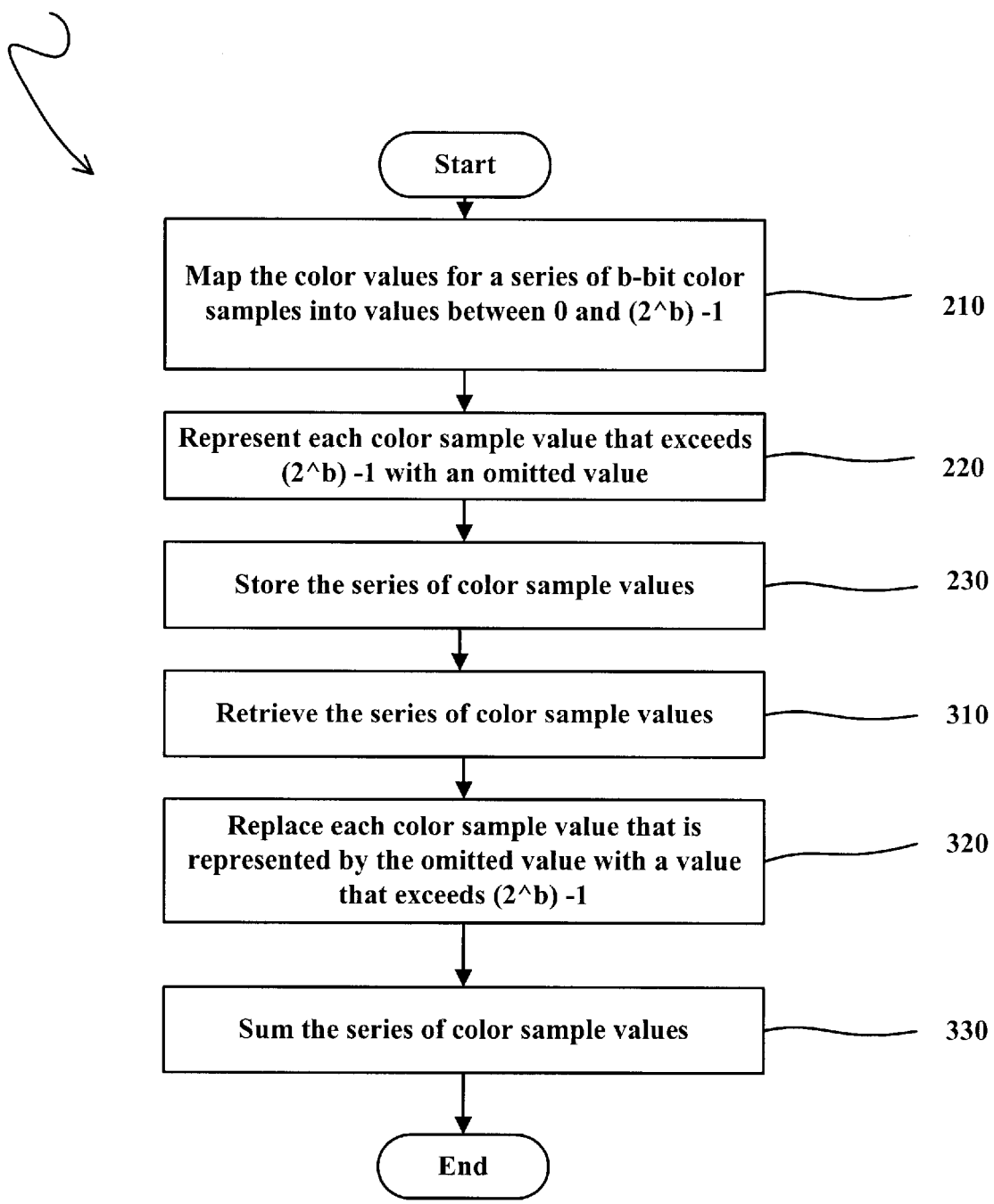

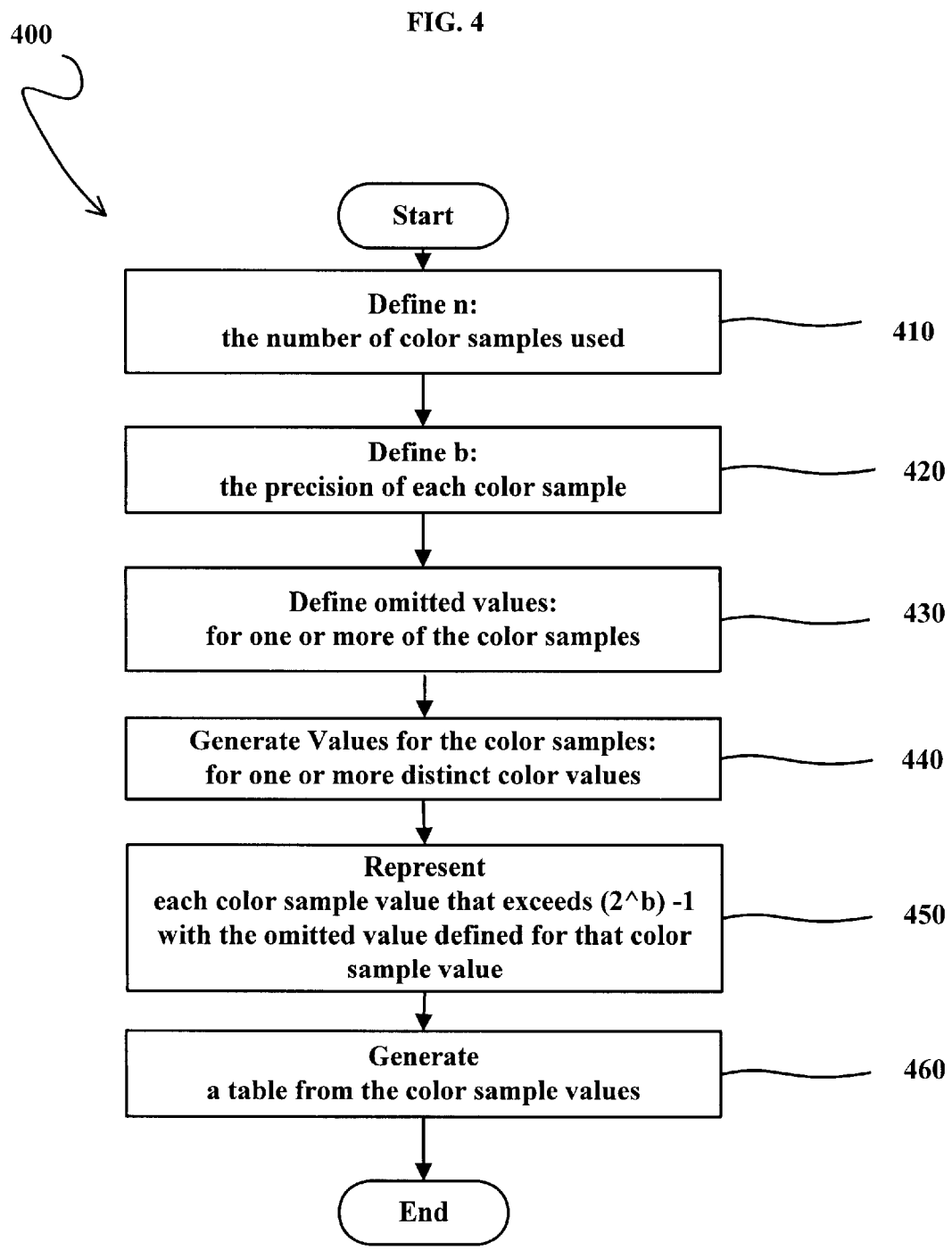

MULTISAMPLE DITHER METHOD WITH EXACT RECONSTRUCTION

FIELD OF THE INVENTION

The present invention relates generally to systems for computer graphics. More specifically, the present invention includes a method and apparatus for producing accurate pixel colors using a limited number of reduced accuracy samples.

BACKGROUND OF THE INVENTION

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are known as primitives and a single image may require thousands, or even millions, of primitives. Each primitive is defined in terms of its shape and location as well as other attributes, such as color and texture.

The primitives used in early pipeline stages are transformed, during a rasterization stage, into collections of pixels. The rasterization stage is often performed by a specialized graphics processor (in low-end systems, rasterization may be performed directly by the host processor) and the pixels are stored in a device known as a frame buffer. The frame buffer is a memory device that includes individual memory locations for each pixel.

During the rasterization stage, the graphics processor renders each primitive into the frame buffer. The graphics processor accomplishes this task by determining which pixels (i.e., which frame buffer memory locations) are included within the bounds of each primitive. The frame buffer memory locations for included pixels are then initialized to reflect the attributes of the primitive, including color and texture.

In some cases, individual pixels will include portions of more than one primitive. This may occur, for example, at the edge of overlapping or adjacent primitives. When pixels are shared between primitives, a form of pixel aliasing occurs. Pixel aliasing is generally undesirable because it is not always possible to render aliased pixels to accurately reflect each of the primitives in which they are included. As an example, consider the case of a pixel that is shared between primitives of different colors. In such a case, if the pixel is rendered to reflect the color of one primitive, it will be incorrectly colored for the remaining primitives in which it is included.

Multisample antialiasing is a technique that is designed to improve the appearance of aliased pixels. The underlying idea of multisample antialiasing is to generate color values for a series of sample locations within each pixel (rather than at a single location per-pixel). This process is generally referred to as dithering. The color values for the sample locations are generated as part of the rendering process. Each time a primitive is rendered, the color values for the samples included within that primitive are generated. When all of the primitives that include a given pixel have been rendered, a color for that pixel can be generated. The pixel color is generated by averaging, or otherwise combining the values of the color samples for that pixel.

The process of combining or averaging color sample values can be subdivided into two cases: reconstruction and construction. The first case, reconstruction, occurs when all of the color sample values have been generated for the same color value. This may happen, for example, when a pixel is included entirely within a single primitive. It can also happen when a pixel is shared between different primitives that have identical coloring at the pixel's location. In these cases, the color sample values are optimally combined in a way that is an exact reconstruction of the original color value.

The second case, construction, occurs when the color sample values have been generated for two or more color values. This typically happens when a pixel is shared between primitives having distinct color values. In these cases, the color sample values are combined in a way that is an intermediate color value. The intermediate color value creates a visually pleasing transition between primitives.

Multisample antialiasing is an effective technique for improving the appearance of aliased pixels. At the same time, the use of multiple color samples increases the amount of memory that is used by each pixel. Memory bandwidth must also be increased to allow each of the multiple color sample values to the stored and retrieved.

Providing greater storage capacity and bandwidth makes graphics processors more expensive and makes multisample antialiasing less desirable. One way in which this disadvantage may be partially overcome is by using smaller color samples. This is the approach used within ONYX2 INFINITEREALITY computer systems produced by SILICON GRAPHICS, INC. INFINITEREALITY computer systems pair each pixel location with a series of color samples. The number of color samples used for each pixel (referred to as n in this document) is runtime configurable. Typical values for n include four, eight and sixteen color samples for each pixel. The precision of each color sample (referred to as b in this document) is based on n and the precision of each rasterized pixel (referred to as B in this document). The relation between n, b and B is defined by the equation:

$$b = B - \log_2(n)$$

As an example, if five bits of color are stored for each rasterized pixel (i.e., B=5) and four color samples are used for each pixel (n=4), then each color sample would have a precision of three bits (b=3). The rasterizing process generates the n color sample values for each pixel using a set of equations of the form:

$$S[k] = MIN(2^b - 1, (c+k)/n)$$

where c is the color value being sampled and k ranges from 0 to n−1 and where division is performed as integer division with no remainder. For the preceding example of n=4 and b=3, the following equations are used:

$$S[0] = MIN(7, (c)/4)$$

$$S[1] = MIN(7, (c+1)/4)$$

$$S[2] = MIN(7, (c+2)/4)$$

$$S[3] = MIN(7, (c+3)/4)$$

The color sample values S[k] are then combined to form a pixel color value r using the equation:

$$r = S[0] + S[1] + S[2] + \ldots S[n-1]$$

The INFINITEREALITY multisample antialiasing method is an effective method for reducing the number of bits that must be stored for each color sample. Unfortunately, the INFINITEREALITY multisample antialiasing method does not accurately reconstruct all color values. This occurs because each color sample has limited precision. As the color value being sampled is increased, the value that must be stored in each color sample also increases. There is a point where increasing the color value being sampled would cause the values of the color samples to overflow their limited precision. This overflow is prevented because each color sample value is limited, or clamped, to a predefined maximum value of $2^n-1$. The color sample values generated for the numerically greatest n−1 color values may include one or more of these clamped values. Thus, in the example case of n=4 and b=3, the numerically greatest color is 31. The color sample values generated for the values 31, 30, and 29 each include one or more clamped values and, as a result, are not correctly reconstructed.

This result is summarized in the following table:

| color value | S[0] | S[1] | S[2] | S[3] | reconstructed color value |
| --- | --- | --- | --- | --- | --- |
| 0 | 0 | 0 | 0 | 0 | 0 |
| 1 | 0 | 0 | 0 | 1 | 1 |
| 2 | 0 | 0 | 1 | 1 | 2 |
| 3 | 0 | 1 | 1 | 1 | 3 |
| 4 | 1 | 1 | 1 | 1 | 4 |
| 5 | 1 | 1 | 1 | 2 | 5 |
| 6 | 1 | 1 | 2 | 2 | 6 |
| 7 | 1 | 2 | 2 | 2 | 7 |
| 8 | 2 | 2 | 2 | 2 | 8 |
| 9 | 2 | 2 | 2 | 3 | 9 |
| 10 | 2 | 2 | 3 | 3 | 10 |
| 11 | 2 | 3 | 3 | 3 | 11 |
| 12 | 3 | 3 | 3 | 3 | 12 |
| 13 | 3 | 3 | 3 | 4 | 13 |
| 14 | 3 | 3 | 4 | 4 | 14 |
| 15 | 3 | 4 | 4 | 4 | 15 |
| 16 | 4 | 4 | 4 | 4 | 16 |
| 17 | 4 | 4 | 4 | 5 | 17 |
| 18 | 4 | 4 | 5 | 5 | 18 |
| 19 | 4 | 5 | 5 | 5 | 19 |
| 20 | 5 | 5 | 5 | 5 | 20 |
| 21 | 5 | 5 | 5 | 6 | 21 |
| 22 | 5 | 5 | 6 | 6 | 22 |
| 23 | 5 | 6 | 6 | 6 | 23 |
| 24 | 6 | 6 | 6 | 6 | 24 |
| 25 | 6 | 6 | 6 | 7 | 25 |
| 26 | 6 | 6 | 7 | 7 | 26 |
| 27 | 6 | 7 | 7 | 7 | 27 |
| 28 | 7 | 7 | 7 | 7 | 28 |
| 29 | 7 | 7 | 7 | 7 | 28 |
| 30 | 7 | 7 | 7 | 7 | 28 |
| 31 | 7 | 7 | 7 | 7 | 28 |

The inability to reconstruct n−1 possible color values is, of course, not a crippling limitation. Still, there is no doubt that this is a disadvantage of this multisample antialiasing method.

Based on the preceding, it may be appreciated that a need exists for multisampling antialiasing methods that make effective use of smaller color samples. To be effective, techniques of this type should provide accurate reconstruction of all color values using smaller color samples. Effective techniques should also maximize the range of reproducible colors. It is also important for techniques of this type to be practical, both in terms of structural complexity and cost to produce.

SUMMARY OF THE INVENTION

An embodiment of the present invention includes a method and apparatus for multisample dithering. For a representative embodiment of this method, the graphics pipeline uses a series of color samples for each pixel. The number of color samples used for each pixel (referred to as n) is preferably configurable and generally ranges from four to sixteen color samples per-pixel. The precision of each color sample (referred to as b) is defined by the equation:

$$b = B - \log_2(n)$$

where B is the precision of each rasterized pixel.

The b bits of each color sample do not directly correspond to the values 0 to $2^b-1$. Instead, each color sample (except the first) is defined to span the somewhat larger range of 0 to $2^b$. This is accomplished by defining an omitted value for each color sample (except the first). The bit patterns of the omitted values are used to represent the value $2^b$ (inclusive). This means that each color sample can represent all but one of the values between 0 and $2^b$. As an example, a color sample having three bits would normally span the range of values zero to seven. The present invention would use the same three bits to span the range of values zero to eight. The bit patterns of the omitted values for these color samples would be used to represent the value eight.

The process of converting color values to color sample values is configured so that omitted values are not generated. This is done by mapping each color value to a predefined series of color sample values. In cases where the series of color sample values defined for a color value would normally include an omitted value, the offending color sample value is defined to be the omitted value minus one and the defined value of the color sample value that precedes it in the series is incremented by one to compensate.

Color sample values $2^b$ cannot be directly stored. Instead, each value of this type is replaced with the bit pattern of its associated omitted value. The process of replacing $2^b$ with the bit patterns of omitted values is reversed when color sample values are retrieved.

The color sample values for a pixel are combined by summation. The summation is performed in a way that treats the bit patterns of omitted values as the value $2^b$. Using this method, all of the color values between 0 and $2^B-1$ are accurately reconstructed without increasing the precision required for individual color samples. At the same time, the color sample values are guaranteed to be relatively close to exact values. This means that constructed colors are close to their correct values. Each color sample value is also formed independently. This prevents the types of failure that may occur when heuristics are used to define color sample values based on the values of other color samples. The same method may also be used to further reduce the precision required for each color sample while still maintaining the accuracy of traditional dithering methods.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 3 is a flowchart illustrating an embodiment of the method of multisample dithering.

FIG. 4 is a flowchart illustrating an embodiment of a method for defining a dither table.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
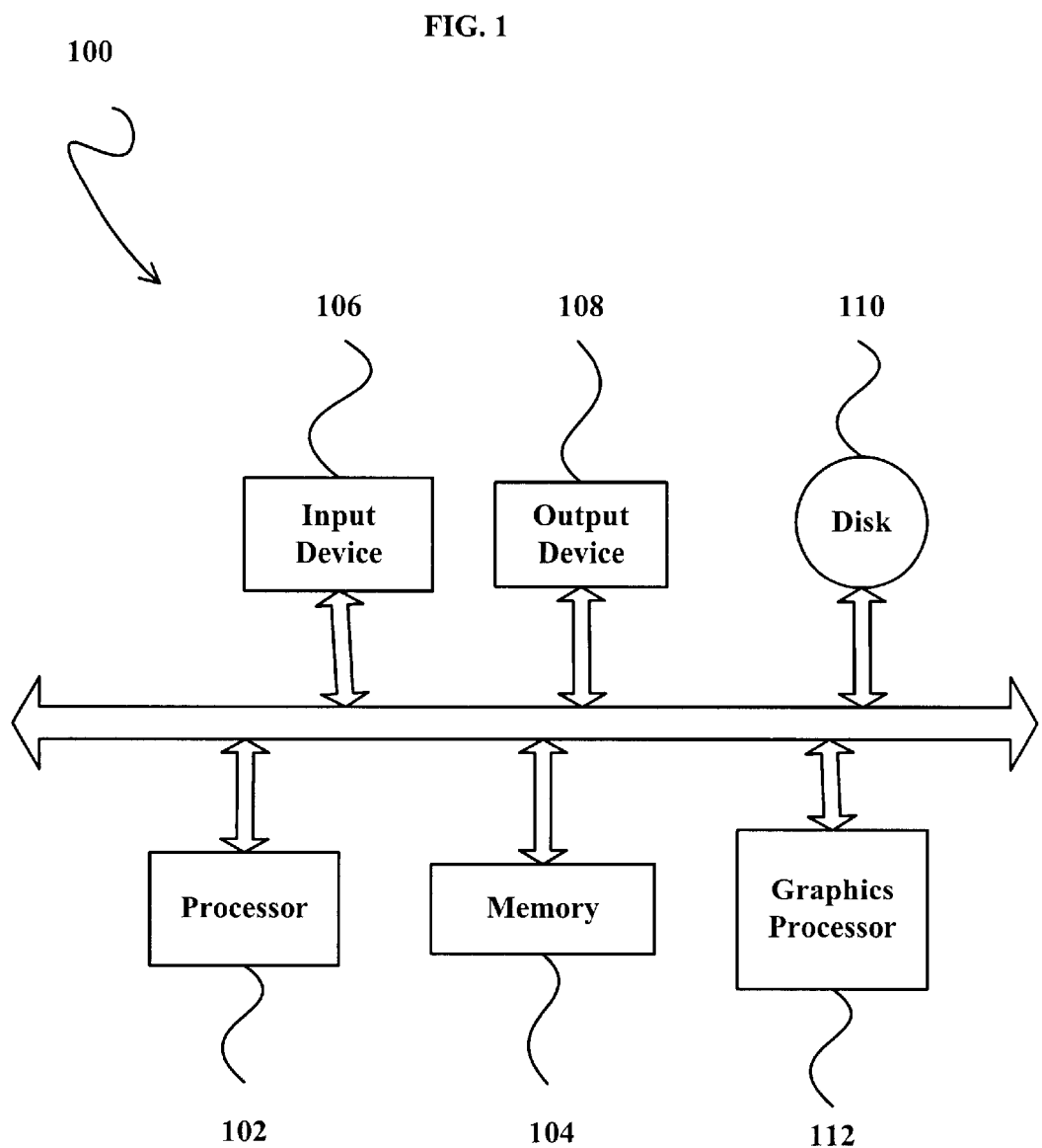
FIG. 1 is a block diagram of a host computer system shown as an exemplary environment for an embodiment of the present invention.
Figure 2:
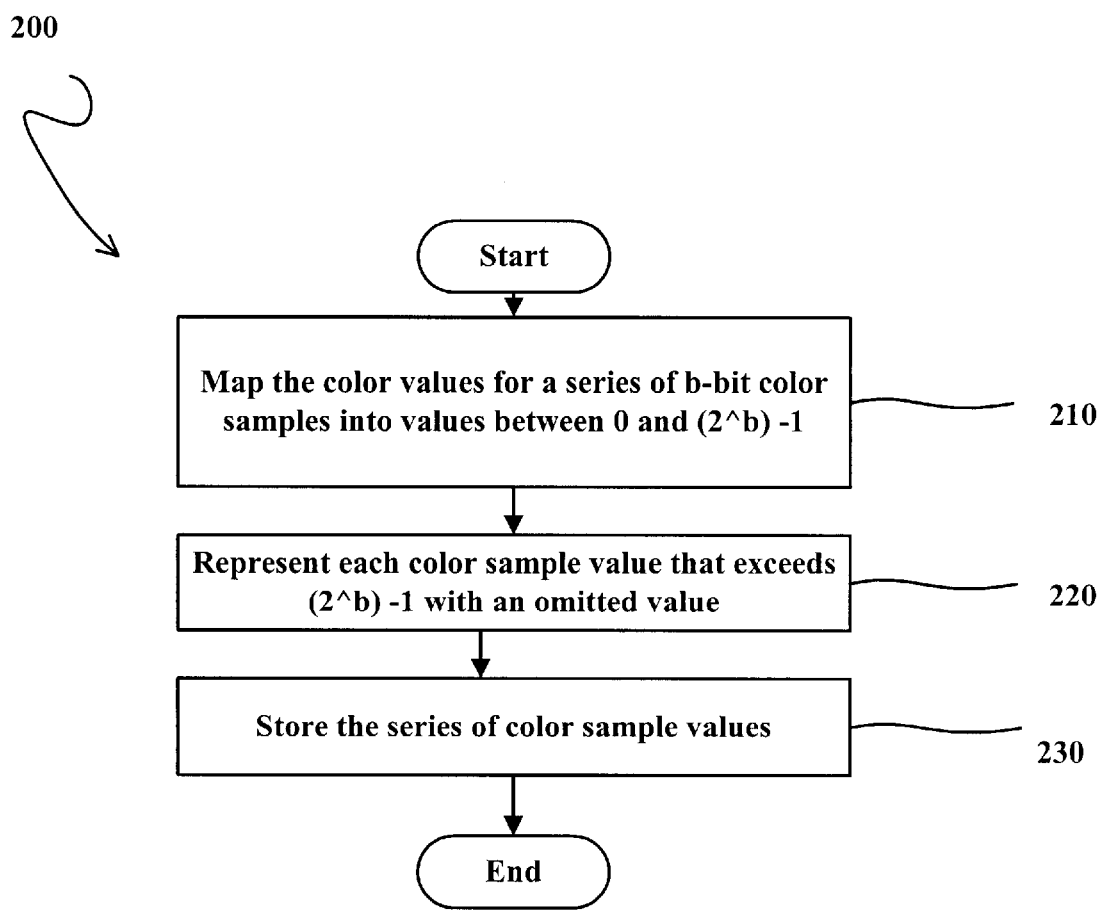
FIG. 2 is a flowchart illustrating an embodiment of the method of multisample dithering.

In FIG. 1, a computer system 100 is shown as a representative environment for the present invention. Structurally, computer system 100 includes a processor, or processors 102, and a memory 104. An input device 106 and an output device 108 are connected to host processor 102 and memory 104. Input device 106 and output device 108 represent a wide range of varying I/O devices such as disk drives, keyboards, modems, network adapters, printers and displays. Each computer system 100 may also include a disk drive 110 of any suitable disk drive type (equivalently, disk drive 110 may be any non-volatile mass storage system such as "flash" memory). Computer system 100 also preferably includes a graphics processor 112 of any suitable type. Host processor 102 and graphics processor 112 collectively implement a sequence of stages known as a graphics pipeline. The graphics pipeline implements all of the tasks required to translate graphics primitives into pixel values. The pixel values are then converted into signals for display on a video display monitor or other output device.

MULTISAMPLE DITHERING METHOD

An embodiment of the present invention includes a method and apparatus for multisample dithering with exact reconstruction. The method and apparatus of the present invention are preferably configured to process some, none, or all of the primitives included in each image that is rendered.

For a representative embodiment of this method, a series of color samples is associated with each pixel. The graphics pipeline generates a color sample value for each color sample. The color sample values generated for each pixel are referred to as S[0], S[1] and so on. The number of color sample values generated for each pixel (referred to as n) is runtime configurable. Typical values for n include four, eight and sixteen color samples for each pixel. The precision of each color sample (referred to as b) is based on n and the precision of each rasterized pixel (referred to as B). The relation between n, b and B is defined by the equation:

$$b = B - \log_2(n)$$

As an example, if five bits of color are stored for each rasterized pixel (i.e., B=5) and four color samples are used for each pixel (n=4), then each color sample would have a precision of three bits (b=3).

For the embodiment being described, one of the color samples (typically the first) is configured to represent the range zero to $2^b-1$. The remaining color samples are configured to represent the range zero to $2^b$. The inclusion of zero within the range of each color sample allows the color samples to be summed to accurately reconstruct the value zero. The inclusion of $2^b-1$ within the range of one color sample and $2^b$ within the range of the remaining color samples allows the color samples to be summed to accurately reconstruct the value $2^B-1$.

To represent the range zero to $2^b$ using only b bits, an omitted value R[k] is defined for each color sample (except the single color sample that is configured to represent the range zero to $2^b-1$). Each omitted value R[k] is included within the range one to $2^b-1$ (inclusive). The bit pattern of each omitted value is used to represent the value $2^b$. The following table summarizes one possible implementation where each color sample s (except the first) omits the value 2s−1:

| color sample value | bit representation for color sample 0 | bit representation for color sample 1 | bit representation for color sample 2 | bit representation for color sample 3 |
| --- | --- | --- | --- | --- |
| 0 | 0 | 0 | 0 | 0 |
| 1 | 1 |   | 1 | 1 |
| 2 | 2 | 2 | 2 | 2 |
| 3 | 3 | 3 |   | 3 |
| 4 | 4 | 4 | 4 | 4 |
| 5 | 5 | 5 | 5 |   |
| 6 | 6 | 6 | 6 | 6 |
| 7 | 7 | 7 | 7 | 7 |
| 8 |   | 1 | 3 | 5 |

The present invention pre-defines the n color sample values that correspond to each color value. The mapping between color values and color sample values is defined in a way that the omitted values R[k] are not generated. To avoid these values, each color value c is mapped to n color sample values S[k] (where k ranges from 0 to n−1 (inclusive)) using the following equations:

$$S[k] = \begin{cases} ((c+k)/n) - 1 & \text{if } R[k] = (c+k)/n & \text{(a)} \\ ((c+k)/n) + 1 & \text{if } R[k+1] = (c+k+1)/n & \text{(b)} \\ (c+k)/n & \text{otherwise} & \text{(c)} \end{cases}$$

Equation (c) defines the value for a color sample in cases where the value is not equal to the omitted value for that color sample. In the alternative (i.e., where the defined value for a color sample would be equal to the omitted value for that color sample) equations (a) and (b) are used. Equation (a) defines the value for the color sample as the value of its omitted value minus one. Equation (b) increment the defined value of the preceding color sample to compensate for application of equation (a).

The process of defining the n color sample values that correspond to each color value is preferably done in a static, non-runtime fashion. The results of this process are then stored in a lookup table or implemented using combinatorial or sequential logic. This allows the graphics pipeline to generate the color sample values that correspond to a particular color value by retrieving the appropriate color sample values from the lookup table or generating the color sample values directly.

Equations (a), (b) and (c) are unclamped. This means that each of these equations may generate any value in the range zero to $2^b$. Color sample values $2^b$ cannot be directly stored. Instead, each value of this type is replaced with the bit pattern of its associated omitted value. For example, a value of eight generated for color sample S[1] would be represented by one (see the preceding table). Values of eight generated for samples S[2] and S[3] would be represented by three and five, respectively. The process of replacing $2^b$ with the bit patterns of omitted values is reversed when color sample values are retrieved.

The n color sample values for a pixel are combined by summation using the equation: $r=S[0]+S[1]+S[2]+\ldots S[n-1]$. Using this method, all of the color values between 0 and $2^B-1$ are accurately reconstructed without increasing the precision required for individual color samples. The following table shows, for each color value, the color sample values defined by equations (a), (b) and (c) (assuming the previous example of B=5, b=3 and n=4). The reconstructed color value formed by the summation of the color sample values is also shown:

| color value | S[0] | S[1] | S[2] | S[3] | reconstructed color value |
|---|---|---|---|---|---|
| 0  | 0  | 0    | 0    | 0    | 0  |
| 1  | 0  | 0    | 0    | 1    | 1  |
| 2  | 0  | 0    | 1    | 1    | 2  |
| 3  | 1* | 0*   | 1    | 1    | 3  |
| 4  | 2* | 0*   | 1    | 1    | 4  |
| 5  | 2* | 0*   | 1    | 2    | 5  |
| 6  | 2* | 0*   | 2    | 2    | 6  |
| 7  | 1  | 2    | 2    | 2    | 7  |
| 8  | 2  | 2    | 2    | 2    | 8  |
| 9  | 2  | 2    | 2    | 3    | 9  |
| 10 | 2  | 3*   | 2*   | 3    | 10 |
| 11 | 2  | 4*   | 2*   | 3    | 11 |
| 12 | 3  | 4*   | 2*   | 3    | 12 |
| 13 | 3  | 4*   | 2*   | 4    | 13 |
| 14 | 3  | 3    | 4    | 4    | 14 |
| 15 | 3  | 4    | 4    | 4    | 15 |
| 16 | 4  | 4    | 4    | 4    | 16 |
| 17 | 4  | 4    | 5*   | 4*   | 17 |
| 18 | 4  | 4    | 6*   | 4*   | 18 |
| 19 | 4  | 5    | 6*   | 4*   | 19 |
| 20 | 5  | 5    | 6*   | 4*   | 20 |
| 21 | 5  | 5    | 5    | 6    | 21 |
| 22 | 5  | 5    | 6    | 6    | 22 |
| 23 | 5  | 6    | 6    | 6    | 23 |
| 24 | 6  | 6    | 6    | 6    | 24 |
| 25 | 6  | 6    | 6    | 7    | 25 |
| 26 | 6  | 6    | 7    | 7    | 26 |
| 27 | 6  | 7    | 7    | 7    | 27 |
| 28 | 7  | 7    | 7    | 7    | 28 |
| 29 | 7  | 7    | 7    | 8 (5)| 29 |
| 30 | 7  | 7    | 8 (3)| 8 (5)| 30 |
| 31 | 7  | 8 (1)| 8 (3)| 8 (5)| 31 |

The asterisks in the preceding table denote color sample values that differ from the color sample values that would have been generated using traditional mulitsample dithering. Parenthesis are used to show omitted values that are being used to represent the value $2^b$.

Based on this table, it may be seen that the multisample dithering method correctly reconstructs all thirty-two color values (0 to 31). Thus, the present invention clearly overcomes disadvantages present in traditional multisample dithering. It should also be appreciated that each color sample value generated by equations (a), (b) and (c) is, at worst, close to the correct or ideal value (in fact, the color sample values are never more than one away from the correct value). As a result, the method will function correctly when constructing intermediate color values for pixels shared between primitives. Each color sample value is also generated independently of all other color sample values. This ensures that the multisample dithering method is well behaved. In particular, the multisample dithering method is not subject to the type of failures that result when color sample values are heuristically selected using the value of nearby color samples.

In general, it should be appreciated that the preceding example is intended to be representative only. Thus, the particular values chosen for n, b and B may vary from those used in an actual implementation. This means that the multisampling dithering method may be adapted to support a range of different color value precisions. The method may also be repeated to support cases where multiple color value components, such as red, blue and green are required.

The selection of omitted values may also differ from what is shown in the table of omitted values. For example, in some implementations, it may be preferable to chose omitted values that are closer to the maximum value $2^b$ of each color sample. This more accurately reflects the natural sensitivity of the human eye which is more sensitive to subtle variations at low intensity. The same approach may be used to reduce the number of bits used in each sample to less than the described $b=B-\log_2(n)$.

Another approach is to omit the same value from each color sample. This has the advantage of simplifying the internal architecture of the graphics pipeline. The following table shows a representative implementation where the same value (in this case, the value four) is omitted from each color sample:

| color sample value | bit representation for color sample 0 | bit representation for color sample 1 | bit representation for color sample 2 | bit representation for color sample 3 |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| 4 |   |   |   |   |
| 5 | 5 | 5 | 5 | 5 |
| 6 | 6 | 6 | 6 | 6 |
| 7 | 7 | 7 | 7 | 7 |
| 8 | 4 | 4 | 4 | 4 |

A dither table that is consistent with this choice of omitted values is the following:

| color value | S[0] | S[1] | S[2] | S[3] | reconstructed color value |
|---|---|---|---|---|---|
| 0  | 0  | 0  | 0  | 0  | 0  |
| 1  | 0  | 0  | 0  | 1  | 1  |
| 2  | 0  | 0  | 1  | 1  | 2  |
| 3  | 0  | 1  | 1  | 1  | 3  |
| 4  | 1  | 1  | 1  | 1  | 4  |
| 5  | 1  | 1  | 1  | 2  | 5  |
| 6  | 1  | 1  | 2  | 2  | 6  |
| 7  | 1  | 2  | 2  | 2  | 7  |
| 8  | 2  | 2  | 2  | 2  | 8  |
| 9  | 2  | 2  | 2  | 3  | 9  |
| 10 | 2  | 2  | 3  | 3  | 10 |
| 11 | 2  | 3  | 3  | 3  | 11 |
| 12 | 3  | 3  | 3  | 3  | 12 |
| 13 | 2* | 3  | 3  | 5* | 13 |
| 14 | 2* | 2* | 5* | 5* | 14 |
| 15 | 2* | 3* | 5* | 5* | 15 |
| 16 | 3* | 3* | 5* | 5* | 16 |
| 17 | 3* | 3* | 5* | 6* | 17 |
| 18 | 3* | 3* | 6* | 6* | 18 |
| 19 | 3* | 5  | 5  | 6* | 19 |
| 20 | 5  | 5  | 5  | 5  | 20 |
| 21 | 5  | 5  | 5  | 6  | 21 |
| 22 | 5  | 5  | 6  | 6  | 22 |
| 23 | 5  | 6  | 6  | 6  | 23 |
| 24 | 6  | 6  | 6  | 6  | 24 |
| 25 | 6  | 6  | 6  | 7  | 25 |
| 26 | 6  | 6  | 7  | 7  | 26 |

-continued

| color value | S[0] | S[1] | S[2] | S[3] | reconstructed color value |
|---|---|---|---|---|---|
| 27 | 6 | 7 | 7 | 7 | 27 |
| 28 | 7 | 7 | 7 | 7 | 28 |
| 29 | 7 | 7 | 7 | 8 (4) | 29 |
| 30 | 7 | 7 | 8 (4) | 8 (4) | 30 |
| 31 | 8 (4) | 8 (4) | 8 (4) | 8 (4) | 32 |

Based on this table, it may be seen that this choice of omitted values results in accurate reconstruction for thirty-one color values (0 to 30). The final value, thirty-one, is reconstructed incorrectly as thirty-two. This error may be corrected by clamping the reconstructed values to a maximum of thirty-one.

BLENDING

The graphics pipeline may perform arithmetic operations, or blending, on the color sample values S[k] after the dithering process and prior to reconstruction. In cases where blending is performed, the graphics pipeline must be configured to avoid generating any omitted values. For this reason, the graphics pipeline rounds each calculation that results in an omitted value to the nearest non-omitted value.

In many implementations, blending operations are performed using floating point arithmetic. It is generally desirable to configure these systems so that color sample values of 0 are treated as exactly 0.0 and color sample values of $2^b$ are treated as exactly 1.0. The implementation of these systems may be simplified if each color sample is configured so that it has a representation for the values 0 and $2^b$. This result is achieved by the previously described implementation that omits the same value from each color sample.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A computer-implemented method for multisample dithering, the method comprising:
   mapping a color value into respective values for a series of b-bit color samples, wherein each color sample is configured to have a minimum value of zero, and wherein one or more of the color samples is configured to have a maximum value that exceeds $2^b-1$, wherein b is a measurement of precision of each color sample in bits and having an integer value of at least one;
   representing each value for a color sample value that exceeds $2^b-1$ with an omitted value defined for that color sample; and
   storing the series of color sample values.

2. A method as recited in claim 1 further comprising:
   retrieving the series of color sample values;
   replacing each color sample value that is represented by the omitted value for the color sample with a value that exceeds $2^b-1$; and summing the series of color sample values.

3. A method as recited in claim 1 wherein each omitted value is greater than zero and less than $2^b$.

4. A method as recited in claim 1 wherein all but one color sample is defined to have the same omitted value.

5. A method as recited in claim 1 wherein each color sample is configured to have a minimum value of zero, and wherein each color sample is configured to have a maximum value of $2^b$.

6. A method as recited in claim 1 wherein the mapping between a color value and the respective values for the series of b-bit color samples is predefined.

7. A method as recited in claim 1 wherein there are n color samples and wherein there are B bits of precision in the color value and wherein the number of bits in each color sample b is related to B and n by the equation $b=B-\log_2(n)$.

8. A computer-implemented method for generating a dithering table, the method comprising:
   defining a value n as the number of color samples used;
   defining a value b as the precision of each color sample in bits and having an integer value of at least one;
   defining omitted values for one or more of the color samples;
   generating values for the color samples for one or more distinct color values;
   representing each color sample value that exceeds $2^b-1$ with the omitted value defined for that color sample value; and
   generating a table from the color sample values.

9. A method as recited in claim 8 wherein the distinct color values have B bits of precision and where b, B and n are related by the equation $b=B-\log_2(n)$.

10. A method as recited in claim 8 wherein each omitted value is greater than zero and less than $2^b$.

11. A method as recited in claim 8 wherein all but one color sample is defined to have the same omitted value.

12. A method as recited in claim 8 wherein each color sample is configured to have a minimum value of zero, and wherein one or more of the color samples is configured to have a maximum value that exceeds $2^b-1$.

13. A method as recited in claim 8 wherein each color sample is configured to have a minimum value of zero, and wherein each color sample is configured to have a maximum value of $2^b$.

14. An electronically-readable medium having stored thereon computer-readable code to permit a computer to effect a method for multisample dithering, comprising:
   mapping a color value into respective values for a series of b-bit color samples, wherein each color sample is configured to have a minimum value of zero, and wherein one or more of the color samples is configured to have a maximum value that exceeds $2^b-1$, wherein b is a measurement of precision of each color sample in bits and having an integer value of at least one;
   representing each value for a color sample value that exceeds $2^b-1$ with an omitted value defined for that color sample; and
   storing the series of color sample values.

15. An electronically-readable medium having stored thereon computer-readable code to permit a computer to effect a method for multisample dithering, comprising:
   defining a value n as the number of color samples used;
   defining a value b as the precision of each color sample in bits and having an integer value of at least one;
   defining omitted values for one or more of the color samples;
   generating values for the color samples for one or more distinct color values; and
   representing each color sample value that exceeds $2^b-1$ with the omitted value defined for that color sample value.

* * * * *